Dec. 21, 1948.   E. L. SCHOFIELD   2,456,739
ADJUSTABLE BIER PIN
Filed June 28, 1946
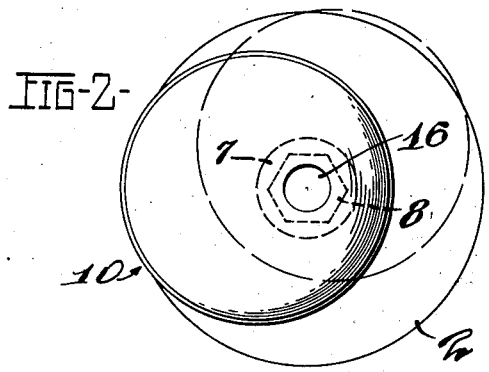
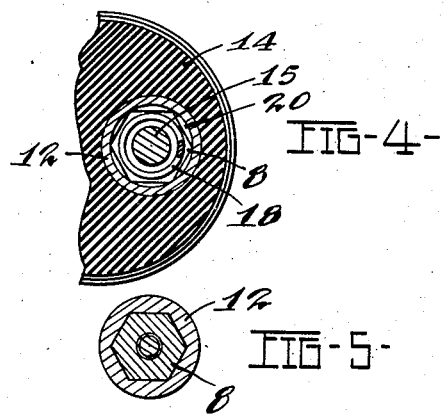
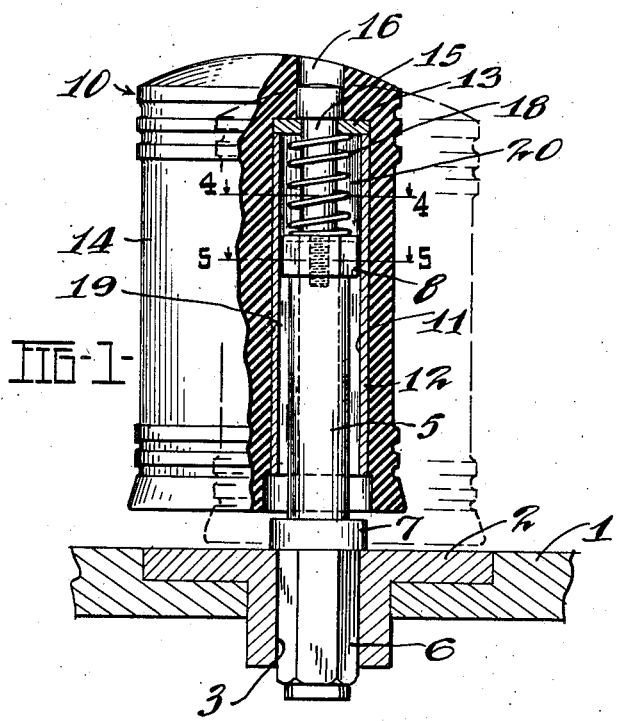
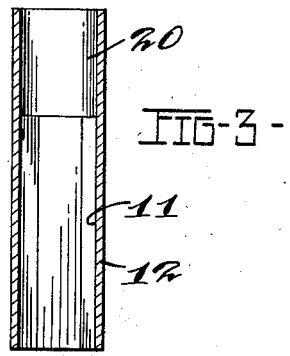
INVENTOR.
EARL L. SCHOFIELD
BY Patented Dec. 21, 1948

2,456,739

UNITED STATES PATENT OFFICE 2,456,739

ADJUSTABLE BIER PIN

Earl L. Schofield, Rockford, Ill., assignor to Superior Coach Corporation, Lima, Ohio, a corporation of Ohio Application June 28, 1946, Serial No. 680,132

5 Claims. (Cl. 296—18)

1

This invention relates to devices intended particularly for use in funeral cars to serve as end stops for caskets positioned therein.

An object of the invention is the provision of a simple and improved device of this character, which is easily and quickly adjustable to efficiently hold a casket against endwise play in the car.

Other objects and advantages of the invention will be apparent from the following detailed description, and from the accompanying drawings, in which:

Fig. 1 is a side elevation of a bier-pin embodying the invention mounted on the floor of a hearse with the floor partially shown; Fig. 2 is a top plan view thereof illustrating diagrammatically various positions of adjustment; Fig. 3 is a central longitudinal section of the socket sleeve receiving the mounting spindle of the device, and Figs. 4 and 5 are fragmentary cross-sections, respectively, on the lines 4—4 and 5—5 in Fig. 1.

Referring to the drawings, 1 designates the floor of a funeral car and 2 a socket plate set therein and having a socket 3 in which the lower end of a bier pin spindle may be mounted. For the purpose of the present invention, the plates 2 are mounted in the car floor in position to receive bier pins for engagement with the ends of a casket positioned in the car to hold it against endwise movement therein.

The bier pin embodying the present invention comprises a spindle 5 having a lower end portion 6 of hexagonal or other form in cross-section suitable for insertion into a complemental floor socket 3 to hold the pin in rigid upright position and prevent rotation thereof. A stop flange or collar 7 is provided on the spindle at the upper end of the portion 6 to limit the permissible extent of insertion of the latter into a socket. The spindle at its upper end is provided with a head 8 for the purpose hereinafter described.

A casket-engaging member 10 of cylindrical or roller form is mounted for rotatable adjustment on the spindle 5 and for such purpose is provided lengthwise with a socket 11 for receiving the upwardly projecting end portion of the spindle. In the present instance, this socket 11 is formed by a sleeve 12 open at its lower end and closed at its upper end, the latter by a disk or washer 13. Around this sleeve is molded or otherwise suitably formed the body portion 14 of the member 10 which may be of rubber or other suitable material.

The axial outward movement of the member 10 on the spindle 5 is limited by a headed stop stud 15 which is extended down through a top

2 opening 16 in the body 14 and the washer 13 into the upper end of the socket 11 and has its lower end threaded into or otherwise fixed to the upper end of the spindle 5. The headed end of the stud slidingly fits in the opening 16 and shoulders against the washer to limit the outward movement of the member 10 relative to the spindle. This outward limit of movement of the member 10 is normally maintained by a coiled expansion spring 18 disposed in the socket 11 between its closed end and the upper end of the spindle.

For the purpose of the present invention the socket 11 is disposed eccentric to the axis of the member 10 to cause such member, when turned on the spindle 5, to have a camming or tightening action against the end of an associated casket to take up play therebetween and serve to hold the casket against relative endwise movements. In order to provide for a stepped rotary adjustment of the member 10, as well as a locking thereof in any position of such adjustment, the spindle head 8 is made of any suitable form in cross-section to provide a predetermined number of circumferentially spaced projections, the head, in the present instance, being of hexagonal form in cross-section to provide six projections, and the interior of the sleeve 12, commencing a distance down from its top, is provided with a complemental portion 19 which receives the spindle head when the member 10 is up in normal position and locks the member against turning adjustment. The socket 11 above the portion 19 is provided with a plain cylindrical portion 20 which, when the member 10 is forced down on the spindle, registers with the head 8 and permits turning of the member on the spindle. It is thus apparent that with a hexagonal form of locking head 8, the member 10 may have a four-positioned adjustment, as indicated diagrammatically at the right of Fig. 2, and that the member, when in normal outward position relative to the spindle, is locked in the adjusted position in which set.

In practice, a hearse floor may be provided in each end portion thereof with a series of sockets 3 in spaced relation lengthwise of the floor so that a bier pin may be mounted in any socket of each set suitable for the length of the particular casket disposed therebetween. As the sockets may not be properly positioned for a concentrically mounted bier pin to firmly engage a casket and to cooperate with a bier pin at the other end to prevent longitudinal movement or play of the casket in the hearse, the body member 10 of the pin is eccentrically mounted to adapt it, by rotary adjustment, to take up casket play. In the present instance, a six-step rotary adjusting movement is provided by the cooperative action of the hexagonal head 8 of the spindle 5 in the complemental portion 19 of the socket 11, the engagement of which is normally retained by the action of the spring 18. To change the adjustment, it is only necessary for the operator to push the member 10 down against the tension of the spring to place the circular portion 20 of the sprocket 11 in register with the locking head 8 of the spindle and then to turn the member to a desired position of adjustment where play is taken up between it and the casket end. The member 10 is then released to permit it to raise under pressure of the spring and cause the socket portion 19 to again have locking engagement with the spindle head to prevent relative rotation.

I wish it understood that my invention is not limited to any specific construction, arrangement or form of the parts, as it is capable of numerous modifications and changes without departing from the spirit of the claims.

Having thus described my invention, what I claim as new, and desire to secure by United States Letters Patent, is:

1. A bier pin comprising a cylindrical body member having therein an eccentric socket parallel with its axis, a spindle having one end mounted in said socket for limited longitudinal movement therein and having its other end projecting beyond the end of the body member and out-of-round for non-rotatable mounting, a portion of the spindle within the socket being out-of-round, a portion of the socket receiving said out-of-round portion for free rotation, and a longitudinally spaced portion of the socket being shaped to engage said out-of-round portion in any one of a plurality of relative axial positions and lock it in that position against rotation.

2. A bier pin comprising a cylindrical body member having therein an eccentric socket parallel with its axis, a spindle having one end mounted in said socket for limited longitudinal movement therein and having its other end projecting beyond the other end of the body member and out-of-round for non-rotatable mounting, said spindle being rotatable within the socket when at one limit of said limited longitudinal movement and the surfaces of the spindle and socket engaging to lock the spindle against rotation in any one of a plurality of positions of rotation when the spindle is at the other limit of its movement.

3. A bier pin in accordance with claim 2 and comprising a spring engaging the cylindrical member and spindle and yieldingly pressing them to effect their relative movement towards their locked position.

4. A bier pin comprising a spindle having a lower end adapted for non-rotatable engagement in a floor socket of a hearse, a cylindrical body member having an eccentric longitudinal socket fitting over and movable longitudinally of the upper end of the spindle, means limiting the longitudinal movement of the body on the spindle, a spring normally holding the body at the upper limit of its movement, the last said socket and spindle having surfaces locking the body against rotation when at its upper limit and freeing it for rotation when it is lowered.

5. A bier pin comprising a spindle, a cylindrical member and a spring, the spindle having one end adapted for non-rotatable engagement with a socket in the floor of a hearse, with its other end projecting vertically upward from the floor, the spindle having an out-of-round head on its upper end, the cylindrical member having an eccentric socket therein parallel with its axis, the socket having walls at one portion adapted to engage said head non-rotatably in a plurality of angularly adjusted positions, the socket having an enlarged portion above said head-engaging portion and into which the head may move, the said enlarged portion being large enough to allow the head to rotate therein, there being a downwardly facing shoulder in the socket above the enlarged portion, and said spring being a coiled compression spring between the head and shoulder and normally holding said member up when the head engages the first said portion of the socket while yieldably permitting depression of said member until the head is in said enlarged portion of the socket.

EARL L. SCHOFIELD.

REFERENCES CITED

The following references are of record in the file of this patent:

UNITED STATES PATENTS

| Number | Name | Date |
|---|---|---|
| 1,812,741 | Van Deest | June 6, 1933 |
| 2,132,543 | Schofield | Oct. 11, 1938 |